(12) United States Patent
Kusumi

(10) Patent No.: US 11,043,830 B2
(45) Date of Patent: Jun. 22, 2021

(54) VEHICLE AND ELECTRIC POWER CONTROL DEVICE FOR VEHICLE

(71) Applicant: Toyota Jidosha Kabushiki Kaisha, Toyota (JP)

(72) Inventor: Hidetoshi Kusumi, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 172 days.

(21) Appl. No.: 16/273,441

(22) Filed: Feb. 12, 2019

(65) Prior Publication Data
US 2019/0252906 A1  Aug. 15, 2019

(30) Foreign Application Priority Data
Feb. 13, 2018  (JP) .............................. JP2018-023397

(51) Int. Cl.
| | |
|---|---|
| *H02J 7/00* | (2006.01) |
| *B60L 58/12* | (2019.01) |
| *B60L 53/63* | (2019.01) |
| *B60L 53/62* | (2019.01) |
| *B60L 53/14* | (2019.01) |
| *B60L 53/10* | (2019.01) |
| *B60L 53/66* | (2019.01) |
| *B60L 50/51* | (2019.01) |

(52) U.S. Cl.
CPC ......... *H02J 7/007192* (2020.01); *B60L 53/11* (2019.02); *B60L 53/14* (2019.02); *B60L 53/62* (2019.02); *B60L 53/63* (2019.02); *B60L 53/66* (2019.02); *B60L 58/12* (2019.02); *B60L 50/51* (2019.02)

(58) Field of Classification Search
CPC .... H02J 7/007192; B60L 53/62; B60L 53/14; B60L 53/11; B60L 53/66; B60L 58/12; B60L 53/63; B60L 50/51; B60L 3/00; Y02T 90/12; Y02T 10/7072; Y02T 90/14; Y02T 10/70; Y02T 90/16
USPC ............................................ 320/109; 701/22
See application file for complete search history.

(56) References Cited

U.S. PATENT DOCUMENTS

| | | | | |
|---|---|---|---|---|
| 2013/0020993 | A1* | 1/2013 | Taddeo ............... | H02J 7/00045 320/109 |
| 2015/0054462 | A1* | 2/2015 | Weidinger ........ | H02J 7/007194 320/109 |

FOREIGN PATENT DOCUMENTS

JP        2014045541 A    3/2014

* cited by examiner

*Primary Examiner* — Zixuan Zhou
(74) *Attorney, Agent, or Firm* — Dinsmore & Shohl LLP

(57) ABSTRACT

An electric power control device for a vehicle which is configured to receive direct current which is supplied from a charging device outside the vehicle and includes an electric storage device configured to be charged by the direct current includes an electronic control unit configured to: acquire maximum output information of the charging device; while the electric storage device is charged by the direct current supplied from the charging device, execute a current limiting process in which the direct current becomes lower than a predetermined value when a parameter relevant to a temperature of a current-carrying component and a threshold of the parameter satisfy a predetermined condition, the current-carrying component being a component in which the direct current flows through; and set the threshold based on the maximum output information of the charging device.

11 Claims, 9 Drawing Sheets

VEHICLE AND ELECTRIC POWER CONTROL DEVICE FOR VEHICLE

CROSS-REFERENCE TO RELATED APPLICATIONS

This application claims priority to Japanese Patent Application No. 2018-023397 filed on Feb. 13, 2018, which is incorporated herein by reference in its entirety including the specification, drawings and abstract.

BACKGROUND

1. Technical Field

The disclosure relates to a vehicle and an electric power control device for a vehicle capable of receiving direct current that is supplied from a charging device outside the vehicle.

2. Description of Related Art

Japanese Patent Application Publication No. 2014-45541 (JP 2014-45541 A) discloses an electric vehicle including an electric storage device. In this vehicle, an evaluation value indicating the temperature of a component (hereinafter referred to as "current-carrying component") which is used to carry current and is connected to the electric storage device is calculated based on a current value that is detected at the time of charge of the electric storage device. When the calculated evaluation value (the temperature of the current-carrying component) exceeds a threshold (constant value), the upper limit value of charge power for the electric storage device is limited. Thereby, it is possible to perform the charge of the electric storage device while restraining overheating of the current-carrying component.

SUMMARY

There is an electric vehicle configured to be capable of being connected to a direct-current (DC) charging device outside the vehicle and configured to be capable of executing a process (hereinafter, also referred to as a "DC charge") of charging the electric storage device mounted on the vehicle, with direct-current power that is supplied from the DC charging device.

In recent years, for shortening the time required for the DC charge, the maximum output of the DC charging device has been increased compared to the related art. In connection with this, there has been developed a DC charging device in which the possible output current value (a maximum output current value) is set to a value (for example, about several hundred amperes) significantly higher than a conventional value (for example, about several dozen amperes). Accordingly, hereafter, DC charging devices having different possible output current values can coexist in the market.

In a vehicle that supports the DC charge using the DC charging device in which the possible output current value is increased compared to the related art, a charge current that is supplied from the DC charging device to the vehicle can be significantly increased compared to the related art. In the current-carrying component through which the charge current flows, a Joule heat proportional to the square of the current value is generated, and therefore, the increase rate of the temperature of the current-carrying component can be remarkably increased compared to the related art.

In JP 2014-45541 A, the upper limit value of the charge power starts to be limited at the time when the temperature of the current-carrying component exceeds the threshold (constant value). However, a temperature increase characteristic of the current-carrying component is determined by the thermal capacity of the whole of the system. Therefore, in the case where the charge current is high, there is a concern that the temperature of the current-carrying component continues to increase for a while even after the charge current starts to be limited, so that the temperature of the current-carrying component exceeds a permissible temperature. Further, when the threshold to be compared with the temperature of the current-carrying component is previously set to a low value as a countermeasure, overheating of the current-carrying component can be restrained. However, there is a concern that the charge power is excessively limited, so that the DC charge cannot be appropriately performed.

The disclosure provides a vehicle and an electric power control device which performs the DC charge while restraining overheating of the current-carrying component through which the charge current flows at the time of the DC charge, in the vehicle configured to be capable of being connected to the DC charging device.

A first aspect of the disclosure relates to an electric power control device for a vehicle, the vehicle being configured to receive direct current which is supplied from a charging device outside the vehicle, the vehicle including an electric storage device configured to be charged by the direct current, the electric power control device comprising an electronic control unit configured to: acquire maximum output information of the charging device; while the electric storage device is being charged by the direct current supplied from the charging device, execute a current limiting process in which the direct current becomes lower than a predetermined value when a parameter relevant to a temperature of a current-carrying component and a threshold of the parameter satisfy a predetermined condition, the current-carrying component being a component in which the direct current flows through; and set the threshold based on the maximum output information of the charging device.

With this device, when the parameter relevant to the temperature of the current-carrying component through which the charge current flows and the threshold satisfy the predetermined condition during the DC charge, current limitation is performed by the current limiting process. The threshold that is used in the current limiting process is not fixed to a constant value, and is set based on the maximum output information of the charging device.

Therefore, for example, when the possible output current value (in other words, a maximum output current value) of the charging device that is specified from the maximum output information of the charging device is high, the threshold can be altered such that the current limitation is easily performed, in consideration of the fact that heat quantity to be generated in the current-carrying component increases proportional to the square of the current value. Thereby, the current limitation is started earlier, and therefore, overheating of the current-carrying component can be restrained.

On the other hand, for example, when the possible output current value of the charging device is low, the threshold can be altered such that the current limitation is hard to be performed, in consideration of the fact that the heat quantity to be generated in the current-carrying component is not very high. Thereby, an excessive current limitation is restrained, and therefore, the DC charge is appropriately performed.

As a result, it is possible to appropriately perform the DC charge while restraining overheating of the current-carrying component through which the charge current flows at the time of the DC charge, in the vehicle configured to be capable of being connected to the DC charging device.

In the above aspect, the parameter relevant to the temperature of the current-carrying component may include information indicating the temperature of the current-carrying component; the current limiting process may include limiting the direct current to be lower than the predetermined value when the temperature of the current-carrying component exceeds the threshold; and the electronic control unit may be configured to set a threshold to be lower as a possible output current value of the charging device is higher, the possible output current value of the charging device being specified from the maximum output information of the charging device.

With this aspect, when the temperature of the current-carrying component exceeds the threshold, the current limitation by the current limiting process is started. The threshold that is used in the current limiting process is set to a lower value, as the possible output current value of the charging device is higher. Therefore, as the possible output current value is higher, the temperature of the current-carrying component exceeds the threshold more easily, and the current limitation by the current limiting process is started earlier. Therefore, even when the possible output current value of the charging device is high, overheating of the current-carrying component can be appropriately restrained.

In the above aspect, the electronic control unit may be configured to: start charging of the electric storage device after setting the threshold; after the charging of the electric storage device is started, when an increase rate of the temperature of the current-carrying component exceeds a reference value, perform an alteration process of decreasing the threshold.

With this aspect, before the start of the DC charge, the threshold that is used in the current limiting process is set based on the possible output current value of the charging device. After the start of the DC charge, when the increase rate of the temperature of the current-carrying component exceeds the reference value, the threshold that is used in the current limiting process is decreased to a value lower than the value before the start of the charge. Thereby, it is possible to appropriately adjust the threshold that is used in the current limiting process, in consideration of the actual increase rate of the temperature of the current-carrying component during the DC charge.

In the above aspect, the electronic control unit may be configured to store the threshold after the alteration process as an initial value of a threshold that is used at a time of next and subsequent charges.

With this aspect, the threshold after the alteration process is stored as the initial value of the threshold that is used at the time of the next and subsequent DC charges. Thereby, at the start of the next and subsequent DC charges, the threshold that is used in the current limiting process can be set to a value in which the actual increase rate of the temperature of the current-carrying component is considered.

In the first aspect, the parameter relevant to the temperature of the current-carrying component may include information indicating an increase rate of the temperature of the current-carrying component; the current limiting process may include limiting the direct current to be lower than the predetermined value when the increase rate of the temperature of the current-carrying component is smaller than the threshold; and the electronic control unit may be configured to set a threshold to be higher as a possible output current value of the charging device is higher, the possible output current value of the charging device being specified from the maximum output information of the charging device.

With this aspect, it is possible to appropriately perform the DC charge while restraining overheating of the current-carrying component through which the charge current flows at the time of the DC charge.

A second aspect of the disclosure relates to a vehicle comprising: a charging port configured to be connected to a charging device outside the vehicle; an electric storage device which is connected to the charging port and is configured to be charged by direct current supplied from the charging device; a communication device configured to acquire maximum output information of the charging device which is connected to the charging port; and an electronic control unit configured to: while the electric storage device is being charged by the direct current supplied from the charging device, execute a current limiting process in which the direct current becomes lower than a predetermined value when a parameter relevant to a temperature of a current-carrying component and a threshold of the parameter satisfy a predetermined condition, the current-carrying component being a component in which the direct current flows through; and set the threshold based on the maximum output information of the charging device.

With this aspect, it is possible to appropriately perform the DC charge while restraining overheating of the current-carrying component through which the charge current flows at the time of the DC charge.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
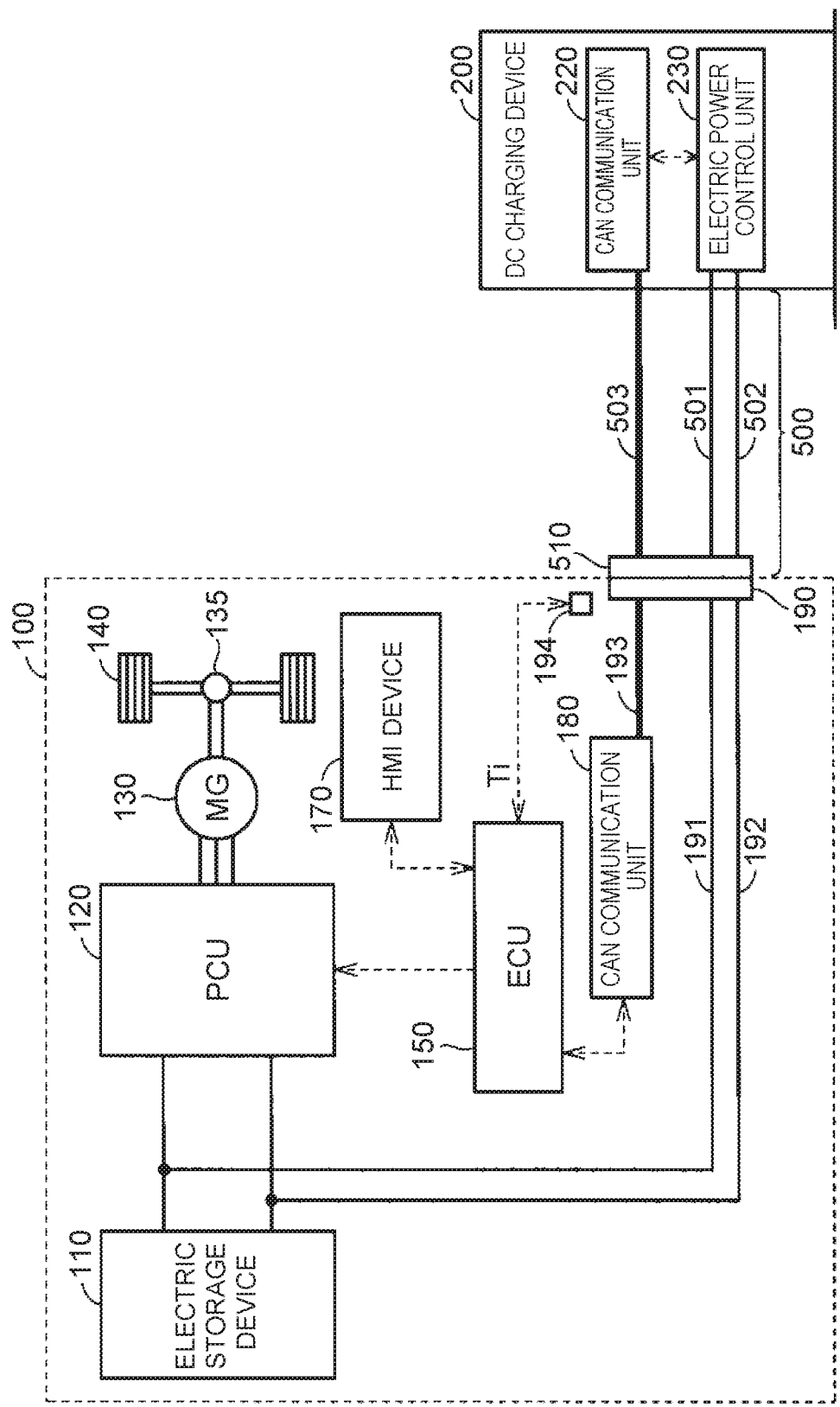
FIG. 1 is a diagram schematically showing a whole configuration of an electric power system.

Hereinafter, an embodiment of the disclosure will be described in detail, with reference to the drawings. In the drawings, identical or equivalent parts are denoted by identical reference characters, and descriptions therefor are omitted.

System Configuration

FIG. 1 is a diagram schematically showing a whole configuration of an electric power system including a vehicle 100 that includes an electric power control device according to the embodiment. The system includes a vehicle 100 and a DC charging device 200 that is installed outside of the vehicle 100.

The vehicle 100 is an electric vehicle configured to be capable of being connected to the DC charging device 200. The vehicle 100 is configured to be capable of executing a "DC charge" of charging an electric storage device mounted on the vehicle 100, with direct-current power that is supplied from the DC charging device 200.

In recent years, as the standard of the DC charge, there are a plurality of standards, as exemplified by CHAdeMO for which standardization is promoted mainly by Japan and Combo (Combined Charging System) for which standardization is promoted mainly by Europe and the U.S.A. The electric power control device in the disclosure can be applied to all standards.

In an example that will be described in the embodiment, a communication between the vehicle 100 and the DC charging device 200 is performed as a communication (hereinafter, also referred to as a "CAN communication") in accordance with a communication protocol, Controller Area Network (CAN) that is employed in CHAdeMO. However, the communication between the two is not limited to the CAN communication. For example, the communication between the two may be performed as a power line communication (PLC) that is employed in Combo. Further, a wireless communication may be performed between the two.

The vehicle 100 includes an electric storage device 110, a power control unit (PCU) 120, a motor generator 130, a power transmission gear 135, drive wheels 140, an electronic control unit (ECU) 150 and a human machine interface (HMI) device 170.

The electric storage device 110 is configured to be capable of being charged and discharged. For example, the electric storage device 110 is configured to include a secondary battery such as a lithium ion battery or a nickel-hydrogen battery. The electric storage device 110 may be a battery in which a liquid material is used as an electrolyte, or may be a battery (a so-called all-solid battery) in which a solid material is used as the electrolyte. The electric storage device 110 may be configured to include an electric storage element such as an electric double layer capacitor. The electric storage device 110 supplies, to the PCU 120, electric power for generating drive power of the vehicle 100. The electric storage device 110 stores electric power generated by the motor generator 130.

The PCU 120, which is controlled by a control signal from the ECU 150, converts the direct-current power from the electric storage device 110 into alternating-current power for driving the motor generator 130, and converts alternating-current regenerative power from the motor generator 130 into direct-current power for charging the electric storage device 110.

The motor generator 130 is an alternating-current rotating machine, and for example, is a permanent magnet type synchronous motor including a rotor in which a permanent magnet is buried. The rotor of the motor generator 130 is mechanically connected to the drive wheels 140 through the power transmission gear 135. At the time of regenerative braking operation of the vehicle 100, the motor generator 130 can generate electric power using rotating force of the drive wheels 140.

The HMI device 170 is a device that replays and provides picture information or voice information from the ECU 150, for a user, and that accepts an operation by the user. The HMI device 170 is configured to include a display, a speaker, a touch panel, an input switch and the like.

Furthermore, the vehicle 100 includes a DC inlet 190, electric power lines 191, 192, a CAN communication unit 180, a CAN communication line 193, and a temperature sensor 194, as constituents for performing the DC charge.

The CAN communication unit 180 is configured to perform the CAN communication with the DC charging device 200.

The DC inlet 190 is connected to the electric storage device 110 through the electric power lines 191, 192, and is configured to be capable of being connected to a DC charge connector 510 that is provided at an end portion of an electric power cable 500 of the DC charging device 200.

The temperature sensor 194 detects the temperature of the DC inlet 190 (hereinafter, also referred to as "DC inlet temperature Ti"), and outputs the detection result to the ECU 150.

The ECU 150 includes a central processing unit (CPU), a memory, an input-output buffer and the like, which are not illustrated in FIG. 1, and performs various controls for the vehicle 100. These controls may be processed by constructing dedicated hardware (electronic circuit), without being limited to processes by software.

The DC charging device 200 is a facility for supplying direct-current power to the vehicle 100. The DC charging device 200 includes a CAN communication unit 220, an electric power control unit 230 and the electric power cable 500. The electric power cable 500 includes electric power lines 501, 502 connected to the electric power control unit 230 and a CAN communication line 503 connected to the CAN communication unit 220.

The electric power control unit 230 is configured to be capable of controlling parameters (a current value and a voltage value) of the direct-current power that is supplied to the vehicle 100 through the electric power cable 500 (the electric power lines 501, 502). The CAN communication unit 220 is configured to perform the CAN communication with the vehicle 100 through the CAN communication line 503.

In a state where the DC charge connector 510 is connected to the DC inlet 190, the electric power lines 501, 502 of the electric power cable 500 are connected to the electric power lines 191, 192 of the vehicle 100, respectively. Thereby, the electric power control unit 230 of the DC charging device 200 and the electric storage device 110 of the vehicle 100 are electrically connected, resulting in a state where the DC charge can be performed.

Further, in the state where the DC charge connector 510 is connected to the DC inlet 190, the CAN communication line 503 of the electric power cable 500 is connected to the CAN communication line 193 of the vehicle 100. Thereby, the CAN communication unit 220 of the DC charging device 200 and the CAN communication unit 180 of the vehicle 100 are connected to each other, resulting in a state where the CAN communication can be performed between the two.

The vehicle 100 and the DC charging device 200 perform the DC charge while sending and receiving data to each other by the CAN communication. The data to be sent from the vehicle 100 to the charging device 200 includes a DC charge start request, a charge voltage upper limit value, a charge current command value and the like. The data to be sent from the DC charging device 200 to the vehicle 100 includes maximum output information (a possible output voltage value, a possible output current value Imax and the like), and present output information (a present output voltage value, a present charge current value and the like).

Variation of Possible Output Current Value (Maximum Output) of DC Charging Device In recent years, there is a DC charging device 200 in which the maximum output is increased compared to a conventional value, for shortening the time required for the DC charge. Therefore, multiple kinds of DC charging devices 200 having different maximum outputs coexist in the market. The maximum output of the DC charging device 200 is the maximum (unit: kW) of the electric power that the DC charging device 200 can output to the vehicle 100. Generally, the possible output current value Imax of the DC charging device 200 is set to a higher value, as the maximum electric power of the DC charging device 200 is higher. The possible output current value Imax is the maximum (unit: A) of the current value that the DC charging device 200 can output.

In the following description, as an example, it is assumed that four kinds of DC charging devices 200 having different possible output current values Imax coexist in the market. Specifically, the four kinds of DC charging devices 200 are (1) a DC charging device 200 in which the possible output current value Imax is a "predetermined value Ia" equivalent to the conventional value, (2) a DC charging device 200 in which the possible output current value Imax is a "predetermined value Ib" higher than the predetermined value Ia, (3) a DC charging device 200 in which the possible output current value Imax is a "predetermined value Ic" higher than the predetermined value Ib, and (4) a DC charging device 200 in which the possible output current value Imax is a "predetermined value Id" higher than the predetermined value Ic.

For example, the predetermined values Ia, Ib, Ic, Id to be set as the possible output current value Imax are about 50 A (a maximum electric power of 25 kW), about 125 A (a maximum electric power of 50 kW), 250 A (a maximum electric power of 150 kW) and 400 A (a maximum electric power of 250 kW), respectively.

Current Limitation in DC Charge

In the above assumption, the maximum of the possible output current value Imax in the market is the "predetermined value Id" (for example, about 400 A). The vehicle 100 according to the embodiment is configured to support also the DC charging device 200 in which the possible output current value Imax is the "predetermined value Id".

Accordingly, the charge current that is supplied from the DC charging device 200 to the vehicle 100 can be a value (the predetermined value Id) that is significantly higher than the conventional value (the predetermined value Ia). In the current-carrying component through which the charge current flows, a Joule heat proportional to the product of the resistance value and the square of the current value is generated, and therefore, the increase rate of the temperature of the current-carrying component can be remarkably increased compared to the related art.

Particularly, a contact portion between the DC connector 510 and the DC inlet 190 tends to have a resistance value higher than other portions, and therefore, is more easily influenced by the Joule heat.

In view of the above point, the ECU 150 according to the embodiment monitors a DC inlet temperature Ti (a detection value of the temperature sensor 194) during the DC charge, and when the DC inlet temperature Ti exceeds a "threshold Tth", the ECU 150 executes a process (hereinafter, also referred to as a "current limiting process") of requesting the DC charging device 200 to limit the charge current to lower than a predetermined value. Further, the ECU 150 performs a process (hereinafter, also referred to as a "threshold setting process") of setting the "threshold Tth" that is used in the current limiting process, based on the possible output current value Imax of the DC charging device 200, instead of fixing the "threshold Tth" to a constant value. Each of the threshold setting process and the current limiting process will be described below in detail.

Threshold (Tth) Setting Process

Figure 2:
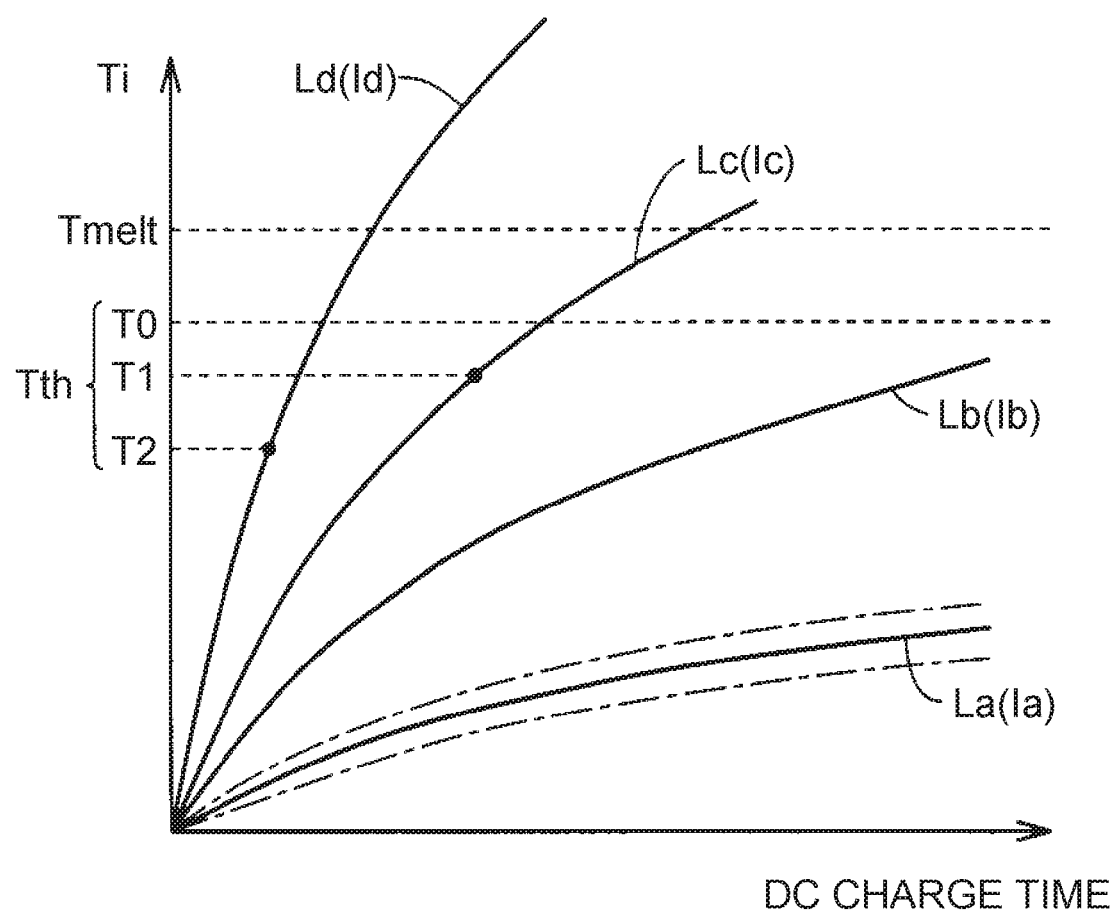
FIG. 2 is a diagram (part 1) showing an exemplary temperature increase characteristic of a DC inlet temperature Ti.

FIG. 2 is a diagram showing an exemplary temperature increase characteristic of the DC inlet temperature Ti during the DC charge. In FIG. 2, the abscissa axis indicates a DC charge time (a time during which the DC charge is continued), and the ordinate axis indicates the DC inlet temperature Ti. Curves La to Ld shown in FIG. 2 are curves showing changes in the DC inlet temperature Ti in the case of charge currents of the predetermined values Ia to Id (Ia<Ib<Ic<Id). An upper limit temperature Tmelt shown in FIG. 2 is a temperature at which an abnormality (erosion or the like) starts to occur due to overheating of the DC inlet 190.

Conventionally, the possible output current value Imax of the DC charging device 200 is roughly unified at the predetermined value Ia, which is a relatively low value. Therefore, conventionally, even when the current continuously flows at the possible output current value Imax (=Ia) during the DC charge, the DC inlet temperature Ti increases fairly moderately, as shown by the curve La. Even when control performance, sensor error and the like are considered, an increase deviation of the DC inlet temperature Ti is within several percent (see dashed-dotted lines shown above and below the curve La). Therefore, there is conventionally no problem, even when the "threshold Tth" that is used in the current limiting process is fixed to a "predetermined temperature T0" that is relatively close to the upper limit temperature Tmelt.

However, in recent years, as described above, the DC charging devices 200 in which the possible output current value Imax is a value (=the predetermined value Ib, Ic, Id) higher than the conventional predetermined value Ia is being got to market. In the current-carrying component, the Joule heat proportional to the square of the current value is generated, and therefore, when the current value Ib, Ic, Id higher than the conventional predetermined value continuously flows during the DC charge, the DC inlet temperature Ti can increase more rapidly than before (see the curves Lb to Ld). Therefore, when the "threshold Tth" that is used in the current limiting process is fixed to the "predetermined temperature T0" similarly to the related art, there is a concern that the start timing of the current limitation is delayed, so that the DC inlet temperature Ti exceeds the upper limit temperature Tmelt, resulting in an overheat state. Further, when the "threshold Tth" that is used in the current limiting process is previously set to a low value (for example, a "predetermined temperature T2" shown in FIG. 2) as a countermeasure, the DC inlet temperature Ti is restrained from exceeding the upper limit temperature Tmelt, but there is a concern that the DC charge is excessively limited.

Hence, the ECU 150 of the vehicle 100 according to the embodiment sets the "threshold Tth" that is used in the current limiting process, based on the possible output current value Imax of the DC charging device 200 that is acquired from the DC charging device 200 by the CAN communication.

Figure 3:
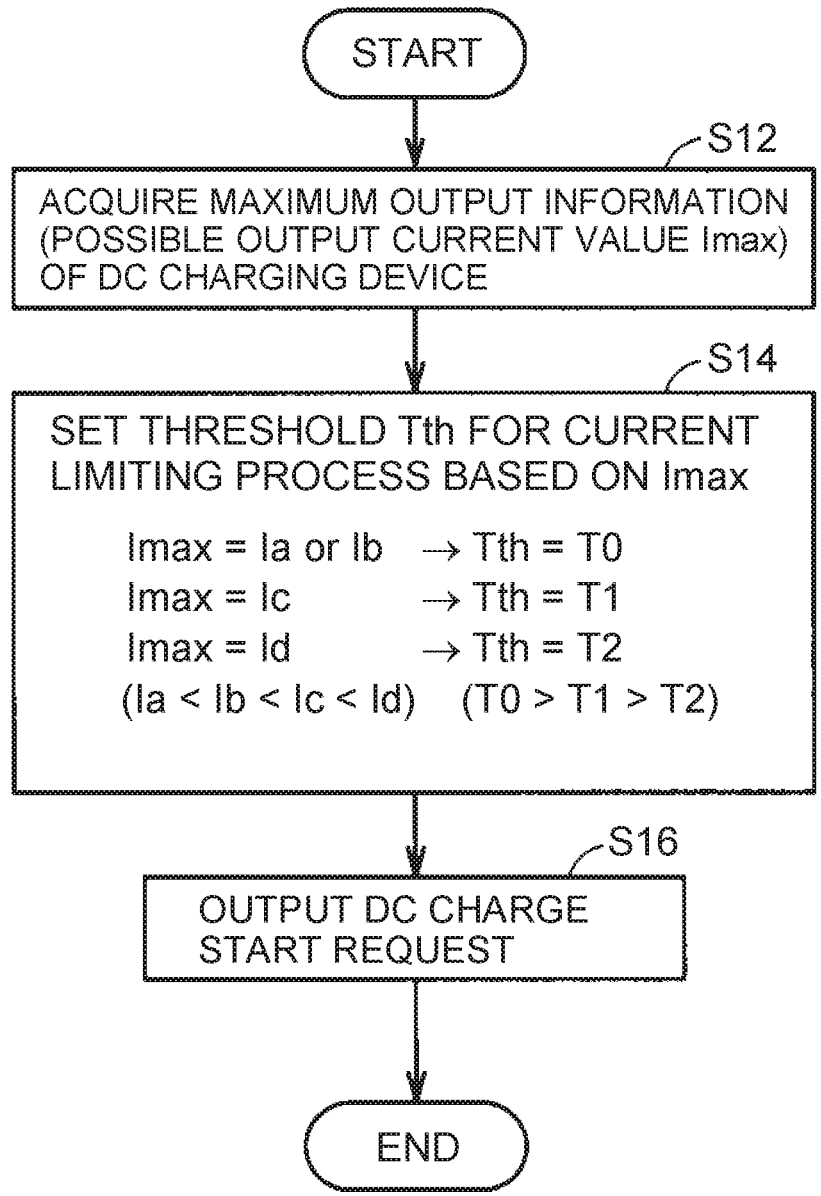
FIG. 3 is a flowchart (part 1) showing an exemplary procedure of a threshold setting process.

FIG. 3 is a flowchart showing an exemplary procedure of the threshold setting process that is executed by the ECU 150. The flowchart is started when the user operates the DC charge connector 510 so as to connect the DC charge connector 510 to the DC inlet 190.

The ECU 150 performs the CAN communication with the DC charging device 200 connected to the DC inlet 190, and acquires the maximum output information of the DC charging device 200 connected to the DC inlet 190 (step S12). As described above, the maximum output information includes the possible output voltage value and possible output current value Imax of the DC charging device 200, and the like. The maximum output information may further include a maximum output power (the product of the possible output current value Imax and the possible output voltage value).

Next, the ECU 150 sets the "threshold Tth" that is used in the current limiting process, based on the possible output current value Imax that is included in the maximum output information acquired in step S12 (step S14).

Specifically, in the case where the possible output current value Imax is the "predetermined value Ia" or the "predetermined value Ib", it is assumed that the DC inlet temperature Ti does not increase rapidly (see the curves La, Lb in FIG. 2), even if the current continuously flows at the possible output current value Imax (=Ia or Ib). Therefore, the ECU 150 sets the threshold Tth to the "predetermined temperature T0", which is relatively close to the upper limit temperature Tmelt.

In the case where the possible output current value Imax is the predetermined value Ic, it is assumed that the DC inlet temperature Ti increases rapidly (see the curve Lc in FIG. 2), if the current continuously flows at the possible output current value Imax (=Ic). Therefore, the ECU 150 sets the threshold Tth to the "predetermined temperature T1", which is lower than the predetermined temperature T0.

In the case where the possible output current value Imax is the predetermined value Id, it is assumed that the DC inlet temperature Ti increases fairly rapidly (see the curve Ld in FIG. 2), if the current continuously flows at the possible output current value Imax (=Id). Therefore, the ECU 150 sets the threshold Tth to the "predetermined temperature T2", which is lower than the predetermined temperature T1.

Information specifying the above-described correspondence relation between the values (Ia, Ib, Ic, Id) of the possible output current value Imax and the values (T0, T1, T2) of the threshold Tth is previously stored in the memory of the ECU 150. The ECU 150 refers to the information to set the threshold Tth corresponding to the acquired possible output current value Imax.

The threshold Tth set in step S14 is stored in the memory of the ECU 150, and is used in the current limiting process (see FIG. 4 described later) that is executed after the start of the DC charge.

After the threshold Tth is set, the ECU 150 outputs the DC charge start request to the DC charging device 200 connected to the DC inlet 190 (step S16). When the DC charging device 200 receives the DC charge start request, the DC charging device 200 starts to supply the direct-current power to the vehicle 100. Thereby, the DC charge is started.

Current Limiting Process

Figure 4:
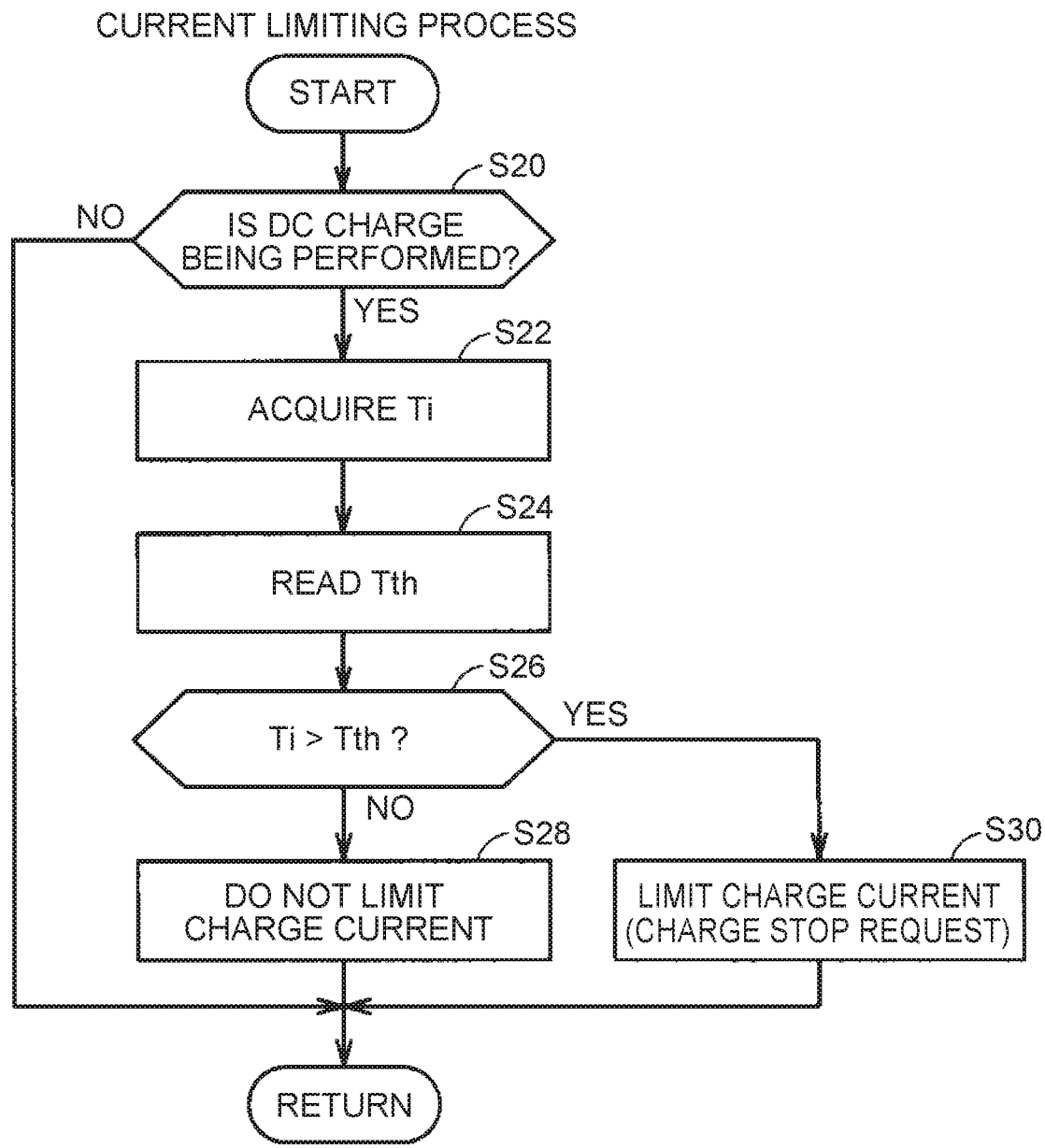
FIG. 4 is a flowchart (part 1) showing an exemplary procedure of a current limiting process.

FIG. 4 is a flowchart showing an exemplary procedure of the current limiting process that is executed by the ECU 150. For example, the flowchart is repeatedly executed with a predetermined period.

First, the ECU 150 determines whether the DC charge is being performed (step S20). In the case where the DC charge is not being performed (NO in step S20), the ECU 150 skips processes after step S20, and the current limiting process transitions to RETURN.

In the case where the DC charge is being performed (YES in step S20), the ECU 150 acquires the DC inlet temperature Ti from the temperature sensor 194 (step S22).

Next, from the memory, the ECU 150 reads the threshold Tth set and stored in the above-described threshold setting process (step S24).

Next, the ECU 150 determines whether the DC inlet temperature Ti is exceeding the threshold Tth (step S26).

In the case where the DC inlet temperature Ti is not exceeding the threshold Tth (NO in step S26), the ECU 150 does not limit the charge current (step S28). Specifically, the ECU 150 permits the charge current command value, which is output to the DC charging device 200, to exceed a predetermined value.

On the other hand, in the case where the DC inlet temperature Ti is exceeding the threshold Tth (YES in step S26), the ECU 150 limits the charge current in the DC charge (step S30). Specifically, the ECU 150 limits the charge current command value, which is output to the DC charging device 200, to be lower than the predetermined value. Thereby, the DC charging device 200 limits the direct current to be supplied to the vehicle 100, to lower than the predetermined value. In the case where the charge current command value is set to zero, the ECU 150 may output a DC charge stop request to the DC charging device 200.

As described above, the ECU 150 according to the embodiment executes the current limiting process of limiting the charge current to lower than the predetermined value, when the DC inlet temperature Ti exceeds the threshold Tth during the DC charge. Further, the ECU 150 performs the threshold setting process of setting the "threshold Tth" that is used in the current limiting process based on the possible output current value Imax of the DC charging device 200, instead of fixing the "threshold Tth" to a constant value.

Specifically, when the possible output current value Imax is a low value (the predetermined value Ia or the predetermined value Ib), the ECU 150 sets the threshold Tth to a relatively high value (the predetermined value T0), in consideration of the fact that the heat quantity to be generated in the DC inlet 190 is not very high. Thereby, the DC inlet temperature Ti becomes hard to exceed the threshold Tth, and an excessive current limitation is restrained, so that the DC charge can be appropriately performed.

On the other hand, when the possible output current value Imax is a high value (the predetermined value Ic or the predetermined value Id), the ECU 150 sets the threshold Tth to a relative low value (the predetermined value T1 or the predetermined value T2), in consideration of the fact that the heat quantity to be generated in the DC inlet 190 increases proportional to the square of the current value. Thereby, the DC inlet temperature Ti easily exceeds the threshold Tth, and the current limitation is started earlier, so that overheating of the DC inlet 190 can be restrained.

First Modification

In the example described in the above embodiment, the DC inlet temperature Ti detected by the temperature sensor 194 is monitored in the current limiting process.

However, the DC inlet temperature Ti is not necessarily limited to the detection by the sensor. For example, the DC charge time and the charge current may be adopted as parameters in the calculation of the DC inlet temperature Ti.

Further, the object to be monitored in the current limiting process is not necessarily limited to the DC inlet temperature Ti. For example, in the case where there is a current-carrying component that is weak against heat, other than the DC inlet 190, in the circuit through which the charge current flows, the temperature of the current-carrying component may be monitored instead of or in addition to the DC inlet 190.

Second Modification

In the example described in the above embodiment, the DC inlet temperature Ti is used as the parameter relevant to the temperature of the DC inlet 190 (current-carrying component). Specifically, in the example, in the current limiting process, the charge current is limited when the DC inlet temperature Ti exceeds the threshold Tth. Further, in the example, in the threshold setting process, the threshold Tth that is used in the current limiting process is set to a lower value, as the possible output current value Imax of the DC charging device 200 is higher.

On the other hand, in an example that will be described in the modification, an increase rate (hereinafter, also referred to as a "DC inlet temperature increase rate ΔTi") of the DC inlet temperature Ti is used as the parameter relevant to the temperature of the DC inlet 190 (current-carrying component). Specifically, in the example, in the current limiting process, the charge current is limited when the DC inlet temperature increase rate ΔTi falls below a threshold ΔTth. Further, in the threshold setting process, the threshold Tth that is used in the current limiting process is set to a higher value, as the possible output current value Imax of the DC charging device 200 is higher.

Figure 5:
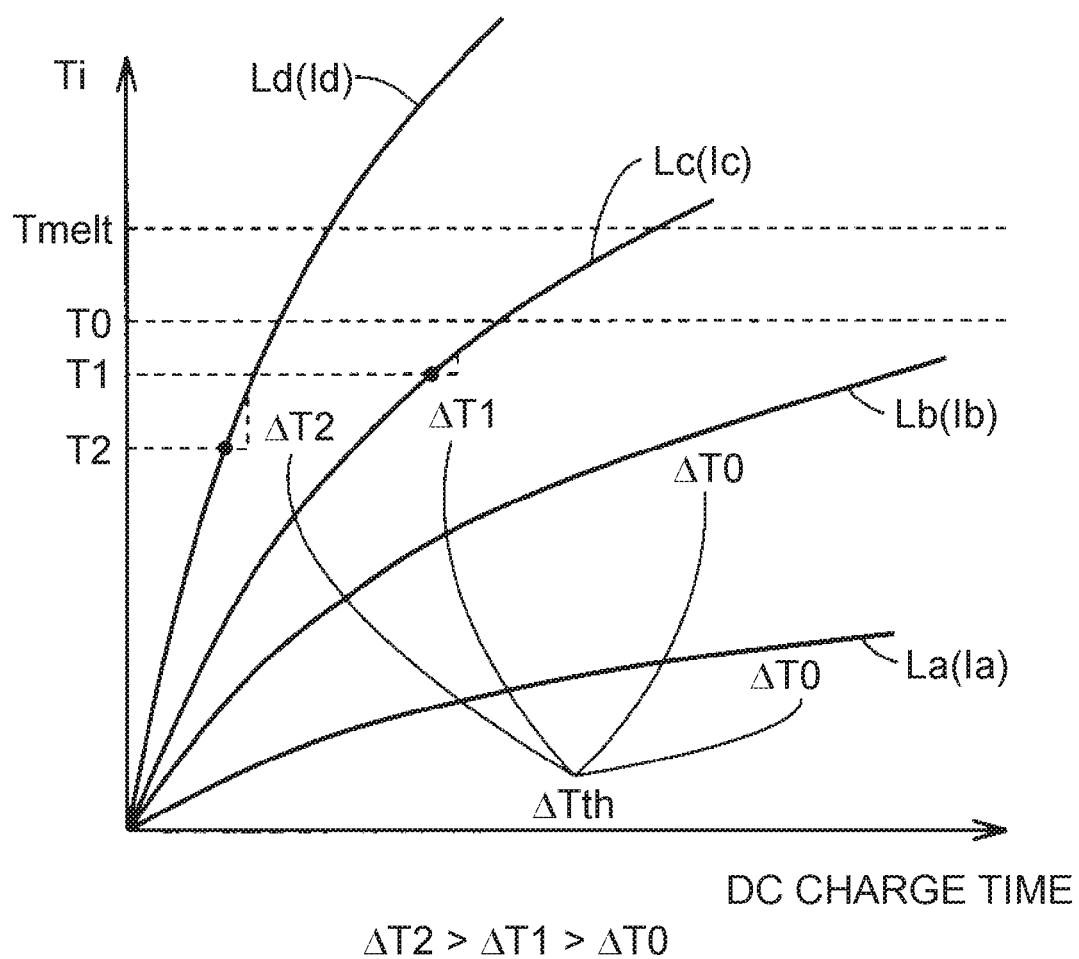
FIG. 5 is a diagram (part 2) showing an exemplary temperature increase characteristic of the DC inlet temperature Ti.

FIG. 5 is a diagram showing an exemplary temperature increase characteristic of the DC inlet temperature Ti in the DC charge. Curves La to Ld shown in FIG. 5 are the same as the curves La to Ld shown in FIG. 2 described above.

As understood from the curves La to Ld shown in FIG. 5, the DC inlet temperature increase rate ΔTi increases as the charge current becomes higher, and in each of the curves La to Ld, the DC inlet temperature increase rate ΔTi decreases as the DC inlet temperature Ti increases and becomes close to the upper limit temperature Tmelt.

In view of this characteristic of the DC inlet temperature increase rate ΔTi, in the current limiting process, the ECU 150 according to the modification monitors the DC inlet temperature increase rate ΔTi and limits the charge current when the DC inlet temperature increase rate ΔTi falls below the threshold ΔTth. Further, in the threshold setting process, the ECU 150 according to the modification sets the threshold ΔTth that is used in the current limiting process, to a higher value, as the possible output current value Imax of the DC charging device 200 is higher.

Figure 6:
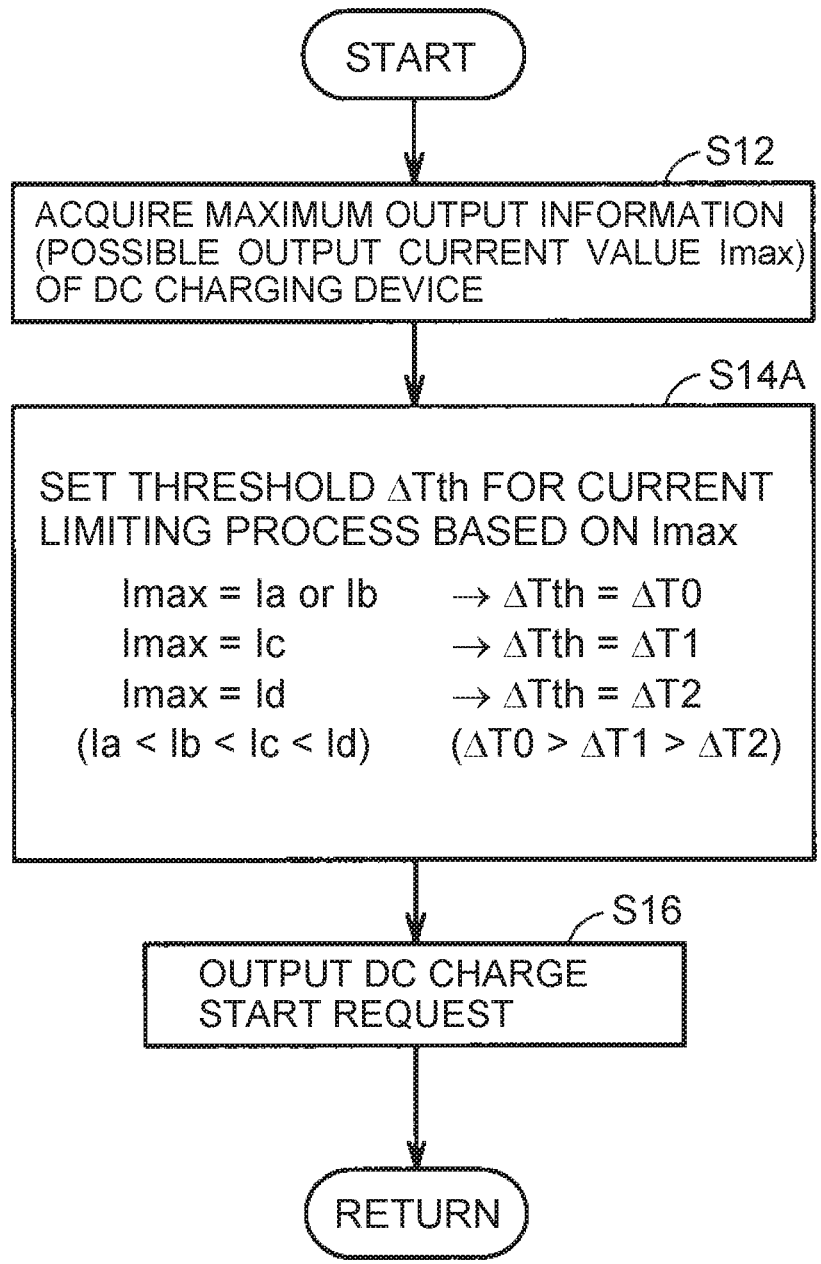
FIG. 6 is a flowchart (part 2) showing an exemplary procedure of the threshold setting process.

FIG. 6 is a flowchart showing an exemplary procedure of the threshold setting process that is executed by the ECU 150 according to the modification. In the flowchart of FIG. 6, step S14 in FIG. 3 described above is altered to step S14A. The other steps (the steps denoted by the same reference characters as the steps shown in FIG. 3 described above) have been already described, and therefore, detailed descriptions therefor are omitted.

The ECU 150 sets the "threshold ΔTth" that is used in the current limiting process, based on the possible output current value Imax acquired in step S12 (step S14A).

Specifically, in the case where the possible output current value Imax is the predetermined value Ia or the predetermined value Ib, the ECU 150 sets the threshold ΔTth to a "predetermined rate ΔT0".

In the case where the possible output current value Imax is the predetermined value Ic, the ECU 150 sets the threshold ΔTth to a "predetermined rate ΔT1", which is higher than the predetermined rate ΔT0.

In the case where the possible output current value Imax is the predetermined value Id, the ECU 150 sets the threshold ΔTth to a "predetermined rate ΔT2", which is higher than the predetermined rate ΔT1.

Figure 7:
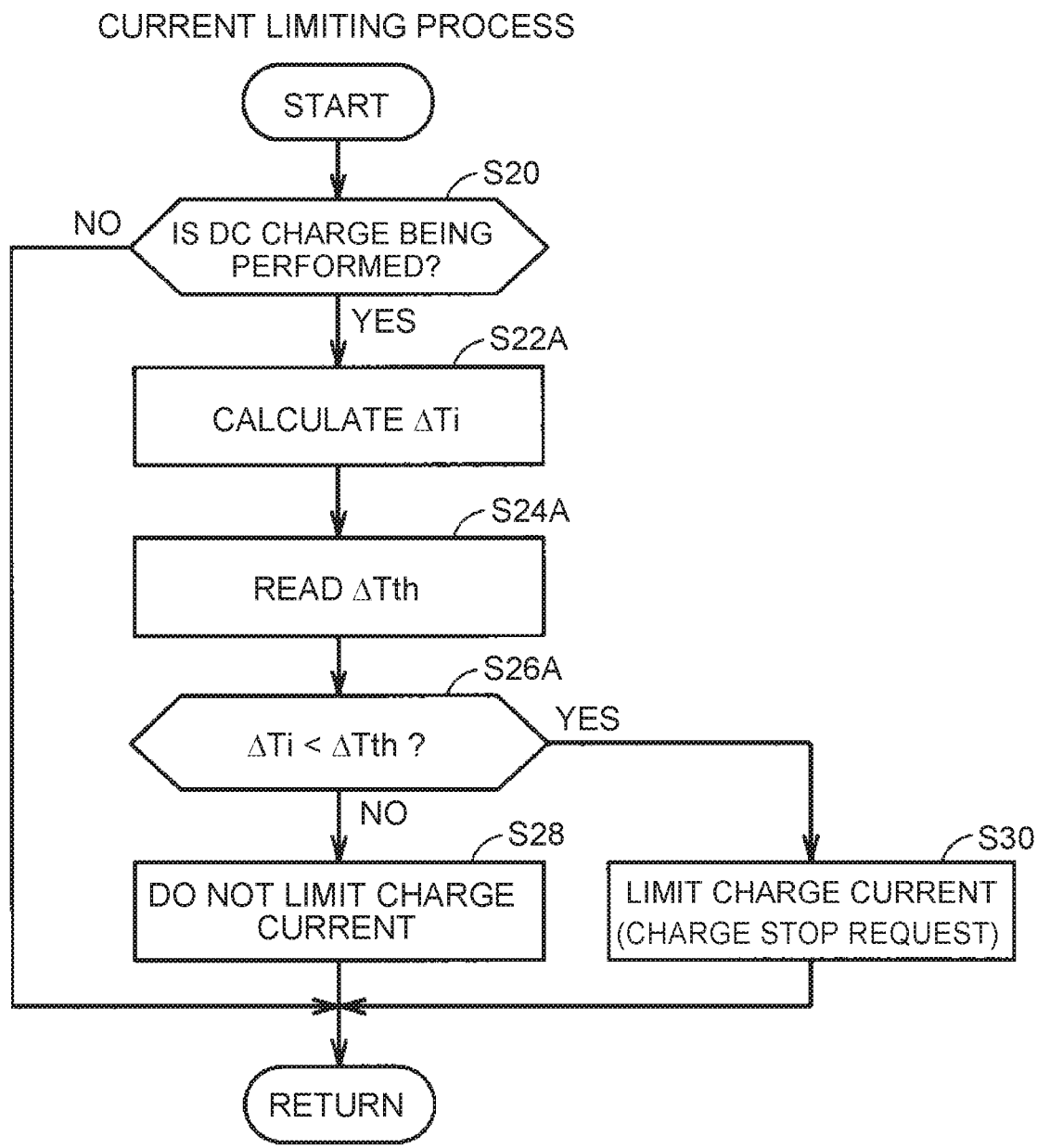
FIG. 7 is a flowchart (part 2) showing an exemplary procedure of the current limiting process.

FIG. 7 is a flowchart showing an exemplary procedure of the current limiting process that is executed by the ECU 150 according to the modification. In the flowchart of FIG. 7, steps S22, S24, S26 in FIG. 4 described above are altered to steps S22A, S24A, S26A, respectively. The other steps (the steps denoted by the same reference characters as the steps shown in FIG. 4 described above) have been already described, and therefore, detailed descriptions therefor are omitted.

In the case where the DC charge is being performed (YES in step S20), the ECU 150 calculates the DC inlet temperature increase rate ΔTi, based on a history of the DC inlet temperature Ti (step S22A).

Next, from the memory, the ECU 150 reads the threshold ΔTth set and stored in the threshold setting process (step S24A).

Next, the ECU 150 determines whether the DC inlet temperature increase rate ΔTi is below the threshold ΔTth (step S26A).

In the case where the DC inlet temperature increase rate ΔTi is not below the threshold ΔTth (NO in step S26A), the ECU 150 does not limit the charge current in the DC charge (step S28).

On the other hand, in the case where the DC inlet temperature increase rate ΔTi is below the threshold ΔTth (YES in step S26A), the ECU 150 limits the charge current in the DC charge (step S30).

As described above, the ECU 150 according to the modification executes the current limiting process of limiting the charge current when the DC inlet temperature increase rate ΔTi falls below the threshold ΔTth during the DC charge. Further, the ECU 150 according to the modification performs the threshold setting process of setting the threshold ΔTth that is used in the current limiting process, to a higher value, as the possible output current value Imax of the DC charging device 200 is higher. Also in such a configuration, similarly to the above-described embodiment, it is possible to appropriately perform the DC charge while restraining overheating of the DC inlet 190.

In the current limiting process, the charge current may be limited using both of the DC inlet temperature Ti and the DC inlet temperature increase rate ΔTi. For example, the charge current may be limited in the case where the DC inlet temperature Ti exceeds the threshold Tth and where the DC inlet temperature increase rate ΔTi falls below the threshold ΔTth. In such a configuration, it is possible to continue the DC charge such that the timing of the start of the current limitation is as late as possible while ensuring that the DC inlet temperature Ti does not exceed the upper limit temperature Tmelt.

Third Modification

The temperature increase characteristic of the DC inlet temperature Ti in the DC charge can change due to a deterioration, a poor contact or the like at the contact portion between the DC charge connector 510 and the DC inlet 190.

Figure 8:
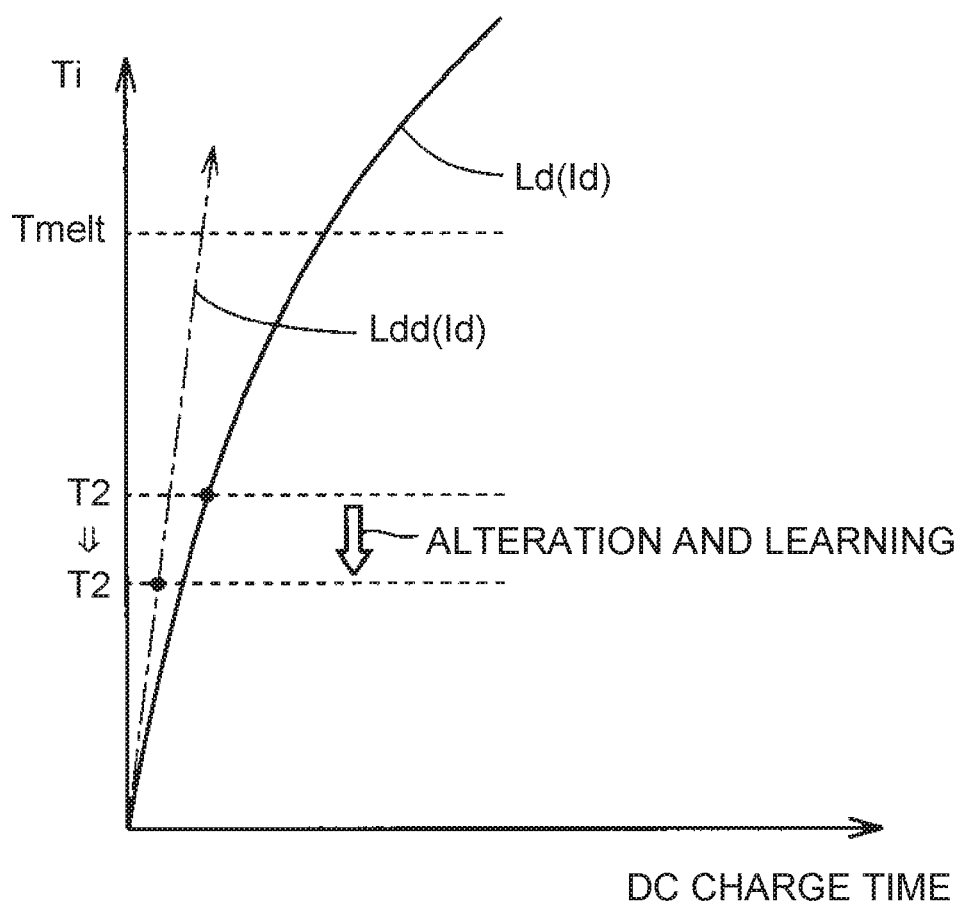
FIG. 8 is a diagram showing an exemplary change in the temperature increase characteristic of the DC inlet temperature Ti.

FIG. 8 is a diagram showing an exemplary change in the temperature increase characteristic of the DC inlet temperature Ti in the DC charge. A curve Ld shown in FIG. 8 is the same as the curve Ld shown in FIG. 2 and FIG. 5 described above. That is, the curve Ld is a curve showing the change in the DC inlet temperature Ti when the charge current is the predetermined value Id.

In the case where a deterioration, a poor contact or the like does not occur at the contact portion between the DC charge connector 510 and the DC inlet 190, it is assumed that the DC inlet temperature Ti increases along the curve Ld.

However, in the case where a deterioration, a poor contact or the like occurs at the contact portion between the DC charge connector 510 and the DC inlet 190, the resistance value of the contact portion increases, and it is assumed that the actual DC inlet temperature Ti, as shown by a dashed-dotted line Ldd in FIG. 8, increases more rapidly than the assumed temperature increase characteristic (see the curve Ld).

Hence, the ECU 150 according to the embodiment monitors the DC inlet temperature increase rate ΔTi after the start of the DC charge (during the DC charge). Further, the ECU 150 dynamically alters the threshold Tth (one of the predetermined temperatures T0, T1, T2) that is used in the present current limiting process, depending on the DC inlet temperature increase rate ΔTi, and learns the threshold Tth (one of the predetermined temperatures T0, Tl, T2) after the alteration, to reflect threshold Tth after the alteration on the next and subsequent current limiting processes.

Figure 9:
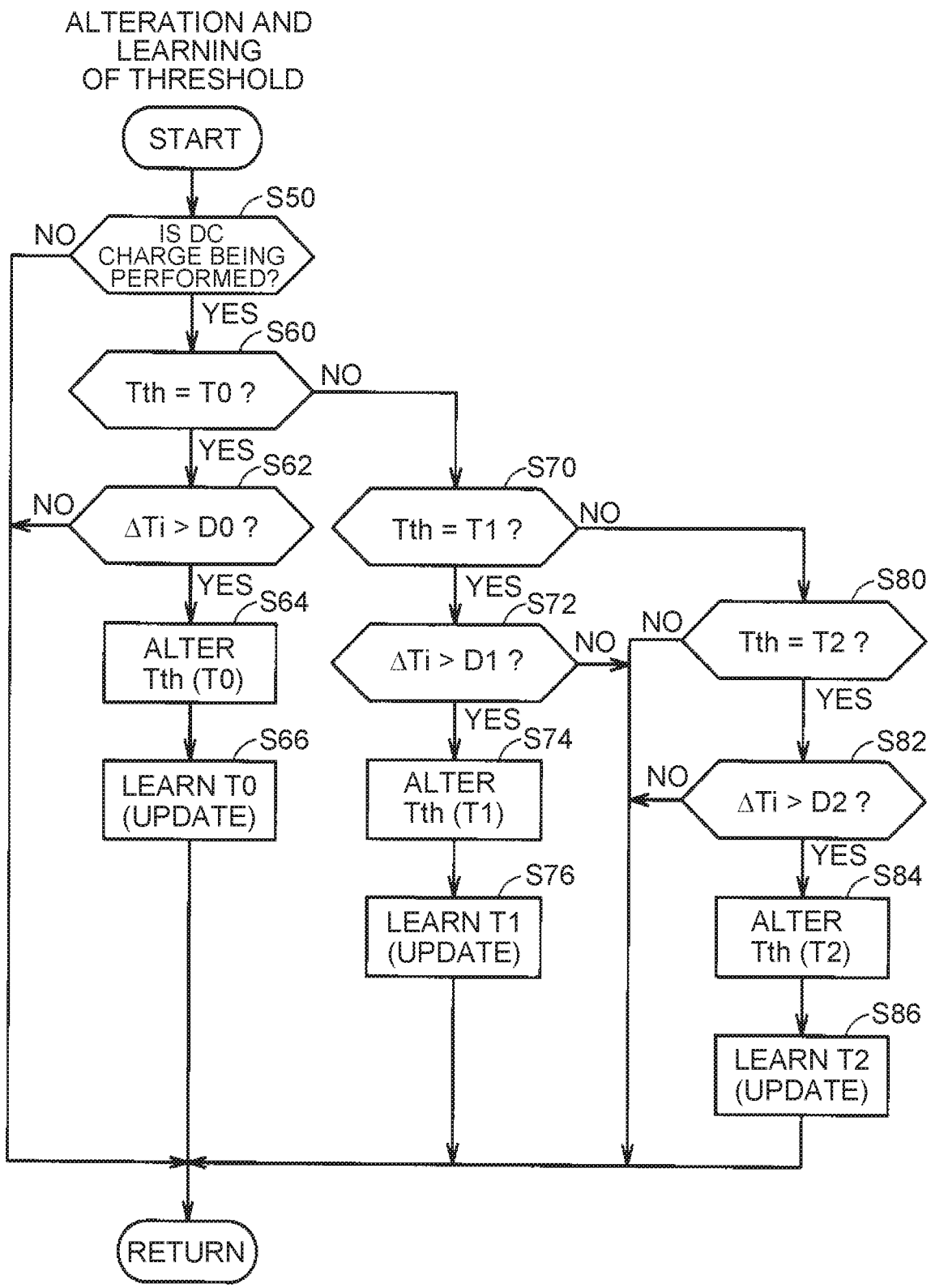
FIG. 9 is a flowchart showing an exemplary processing procedure in which an ECU performs alteration and learning of a threshold Tth during a DC charge.

FIG. 9 is a flowchart showing an exemplary processing procedure in which the ECU 150 according to the modification performs the alteration and learning of the threshold Tth during the DC charge. For example, the flowchart is repeatedly executed with a predetermined period.

First, the ECU 150 determines whether the DC charge is being performed (step S50). In the case where the DC charge is not being performed (NO in step S50), the ECU 150 skips processes after step S50, and the processing procedure transitions to RETURN.

In the case where the DC charge is being performed (YES in step S50), the ECU 150 determines whether the present threshold Tth is the predetermined temperature T0 (step S60). In the case where the present threshold Tth is not the predetermined temperature T0 (NO in step S60), the ECU 150 determines whether the present threshold Tth is the predetermined temperature T1 (step S70). In the case where the present threshold Tth is not the predetermined temperature T1 (NO in step S70), the ECU 150 determines whether the present threshold Tth is the predetermined temperature T2 (step S80).

In the case where the present threshold Tth is the predetermined temperature T0 (YES in step S60), the ECU 150 determines whether the present DC inlet temperature increase rate ΔTi is exceeding a reference value D0 (step S62). For example, the reference value D0 is set to a value resulting from adding a predetermined value to the slope of the curve Lb shown in FIG. 2 and FIG. 5 described above.

In the case where the present DC inlet temperature increase rate ΔTi is exceeding the reference value D0 (YES in step S62), the ECU 150 alters the present threshold Tth (that is, the predetermined temperature T0) (step S64). Specifically, the ECU 150 decreases the present threshold Tth (that is, the predetermined temperature T0) by a previously determined value, such that the current limitation is started earlier.

Then, the ECU 150 learns the predetermined temperature T0 after the alteration (step S66). Specifically, the ECU 150 updates the value of the predetermined temperature T0 stored in the memory, to the value after the alteration. Thereby, the value of the threshold Tth that is used in the present current limiting process is altered in real time (see step S24 in FIG. 4 described above). Furthermore, the value of the predetermined temperature T0 after the learning is used as the initial value (see step S14 in FIG. 3 and step S24 in FIG. 4 described above) of the predetermined temperature T0, in the next and subsequent DC charges.

In the case where the present threshold Tth is the predetermined temperature T1 (YES in step S70), the ECU 150 alters and learns the threshold Tth (the predetermined temperature T1), similarly (steps S72 to S76).

Specifically, the ECU 150 determines whether the present DC inlet temperature increase rate ΔTi is exceeding a reference value D1 (step S72). For example, the reference value D1 is set to a value resulting from adding a predetermined value to the slope of the curve Lc shown in FIG. 2 and FIG. 5 described above.

In the case where the present DC inlet temperature increase rate ΔTi is exceeding the reference value D1 (YES in step S72), the ECU 150 alters the present threshold Tth (that is, the predetermined temperature T1) (step S74). Specifically, the ECU 150 decreases the present threshold Tth (that is, the predetermined temperature T1) by a previously determined value. Then, the ECU 150 learns the predetermined temperature T1 after the alteration (step S76).

In the case where the present threshold Tth is the predetermined temperature T2 (YES in step S80), the ECU 150 alters and learns the threshold Tth (the predetermined temperature T2), similarly (steps S82 to S86).

Specifically, the ECU 150 determines whether the present DC inlet temperature increase rate ΔTi is exceeding a reference value D2 (step S82). For example, the reference value D2 is set to a value resulting from adding a predetermined value to the slope of the curve Ld shown in FIG. 2, FIG. 5 and FIG. 8 described above.

In the case where the present DC inlet temperature increase rate ΔTi is exceeding the reference value D2 (YES in step S82), the ECU 150 alters the present threshold Tth (that is, the predetermined temperature T2) (step S84). Specifically, the ECU 150 decreases the present threshold Tth (that is, the predetermined temperature T2) by a previously determined value (see FIG. 8). Then, the ECU 150 learns the predetermined temperature T2 after the alteration (step S86).

As described above, the ECU 150 according to the modification monitors the DC inlet temperature increase rate ΔTi after the start of the DC charge (during the DC charge), and dynamically alters the threshold Tth (one of the predetermined temperatures T0, T1, T2) that is used in the present current limiting process, depending on the DC inlet temperature increase rate ΔTi. Thereby, it is possible to appropriately adjust the threshold Tth that is used in the current limiting process, in consideration of the actual DC inlet temperature increase rate ΔTi during the DC charge.

Furthermore, the ECU 150 according to the modification learns (stores) the threshold Tth (one of the predetermined temperatures T0, T1, T2) after the alteration, as the initial value of the threshold Tth that is used at the time of the next and subsequent DC charges. Thereby, at the start of the next and subsequent DC charges, the threshold Tth can be set to a value in which the actual DC inlet temperature increase rate ΔTi is considered.

A learning history (alteration history) of the threshold Tth may be stored. Thereby, data analysis of the learning history of the threshold Tth can be performed later. As a result, it is possible to know how the poor connection due to an operation by the user or an aging deterioration of a connection portion occurs in the market, and to perform the utilization for the next improvement item.

Fourth Modification

In the example described in the above embodiment, in the threshold setting process, the threshold Tth is set based on the possible output current value Imax included in the maximum output information that the vehicle 100 acquires from the DC charging device 200.

However, for example, in the case where the correspondence relation between the maximum output power of the DC charging device 200 and the possible output current value Imax is previously determined by a standard, the possible output current value Imax is indirectly specified based on the maximum output power of the DC charging device 200. In view of this point, in the threshold setting process, the threshold Tth can be set based on the maximum output power included in the maximum output information that the vehicle 100 acquires from the DC charging device 200.

It should be understood that the disclosed embodiments are examples and are not limitative in all respects. It is intended that the scope of the disclosure is shown by not the above description but the claims, and includes all modifications in a meaning and scope equivalent to the claims.

What is claimed is:

1. An electric power control device for a vehicle, the vehicle being configured to receive direct current which is supplied from a charging device outside the vehicle, the vehicle including an electric storage device configured to be charged by the direct current, the electric power control device comprising an electronic control unit configured to:
   acquire maximum output information of the charging device;
   while the electric storage device is being charged by the direct current supplied from the charging device, execute a current limiting process in which the direct current becomes lower than a predetermined value such that current flows through a current-carrying component when a parameter relevant to a temperature of the current-carrying component and a threshold of the parameter satisfy a predetermined condition, the current-carrying component being a component in which the direct current flows through; and
   set the threshold based on the maximum output information of the charging device.

2. The electric power control device according to claim 1, wherein:
   the parameter relevant to the temperature of the current-carrying component includes information indicating the temperature of the current-carrying component;
   the current limiting process includes limiting the direct current to be lower than the predetermined value when the temperature of the current-carrying component exceeds the threshold; and
   the electronic control unit is configured to set the threshold to be lower as a possible output current value of the charging device is higher, the possible output current value of the charging device being specified from the maximum output information of the charging device.

3. The electric power control device according to claim 2, wherein the electronic control unit is configured to:
   start charging of the electric storage device after setting the threshold;
   after the charging of the electric storage device is started, when an increase rate of the temperature of the current-carrying component exceeds a reference value, perform an alteration process of decreasing the threshold.

4. The electric power control device according to claim 3, wherein the electronic control unit is configured to store the threshold after the alteration process as an initial value of a threshold that is used at a time of next and subsequent charges.

5. The electric power control device according to claim 1, wherein:
   the parameter relevant to the temperature of the current-carrying component includes information indicating an increase rate of the temperature of the current-carrying component;
   the current limiting process includes limiting the direct current to be lower than the predetermined value when the increase rate of the temperature of the current-carrying component is smaller than the threshold; and
   the electronic control unit is configured to set the threshold to be higher as a possible output current value of the charging device is higher, the possible output current value of the charging device being specified from the maximum output information of the charging device.

6. A vehicle comprising:
   a charging port configured to be connected to a charging device outside the vehicle;
   an electric storage device which is connected to the charging port and is configured to be charged by direct current supplied from the charging device;
   a communication device configured to acquire maximum output information of the charging device which is connected to the charging port; and
   an electronic control unit configured to:
      while the electric storage device is being charged by the direct current supplied from the charging device, execute a current limiting process in which the direct current becomes lower than a predetermined value such that current flows through a current-carrying component when a parameter relevant to a temperature of the current-carrying component and a threshold of the parameter satisfy a predetermined condition, the current-carrying component being a component in which the direct current flows through; and
      set the threshold based on the maximum output information of the charging device.

7. An electric power control device for a vehicle, the vehicle being configured to receive direct current which is supplied from a charging device outside the vehicle, the vehicle including an electric storage device configured to be charged by the direct current, the electric power control device comprising an electronic control unit configured to:
   acquire maximum output information of the charging device;
   while the electric storage device is being charged by the direct current supplied from the charging device, execute a current limiting process in which the direct current becomes lower than a predetermined value when a parameter relevant to a temperature of a current-carrying component and a threshold of the parameter satisfy a predetermined condition, the current-carrying component being a component in which the direct current flows through;
   set the threshold based on the maximum output information of the charging device; and
   start charging of the electric storage device after setting the threshold.

8. The electric power control device according to claim 7, wherein:
   the parameter relevant to the temperature of the current-carrying component includes information indicating the temperature of the current-carrying component;

the current limiting process includes limiting the direct current to be lower than the predetermined value when the temperature of the current-carrying component exceeds the threshold; and the electronic control unit is configured to set the threshold to be lower as a possible output current value of the charging device is higher, the possible output current value of the charging device being specified from the maximum output information of the charging device.

9. The electric power control device according to claim 8, wherein the electronic control unit is configured to:

after the charging of the electric storage device is started, when an increase rate of the temperature of the current-carrying component exceeds a reference value, perform an alteration process of decreasing the threshold.

10. The electric power control device according to claim 9, wherein the electronic control unit is configured to store the threshold after the alteration process as an initial value of a threshold that is used at a time of next and subsequent charges.

11. The electric power control device according to claim 7, wherein:

the parameter relevant to the temperature of the current-carrying component includes information indicating an increase rate of the temperature of the current-carrying component;

the current limiting process includes limiting the direct current to be lower than the predetermined value when the increase rate of the temperature of the current-carrying component is smaller than the threshold; and the electronic control unit is configured to set the threshold to be higher as a possible output current value of the charging device is higher, the possible output current value of the charging device being specified from the maximum output information of the charging device.

* * * * *